D. A. SCOTT.
HOT AIR FURNACE.
APPLICATION FILED DEC. 4, 1920.
1,417,775.
Patented May 30, 1922.
2 SHEETS—SHEET 1.
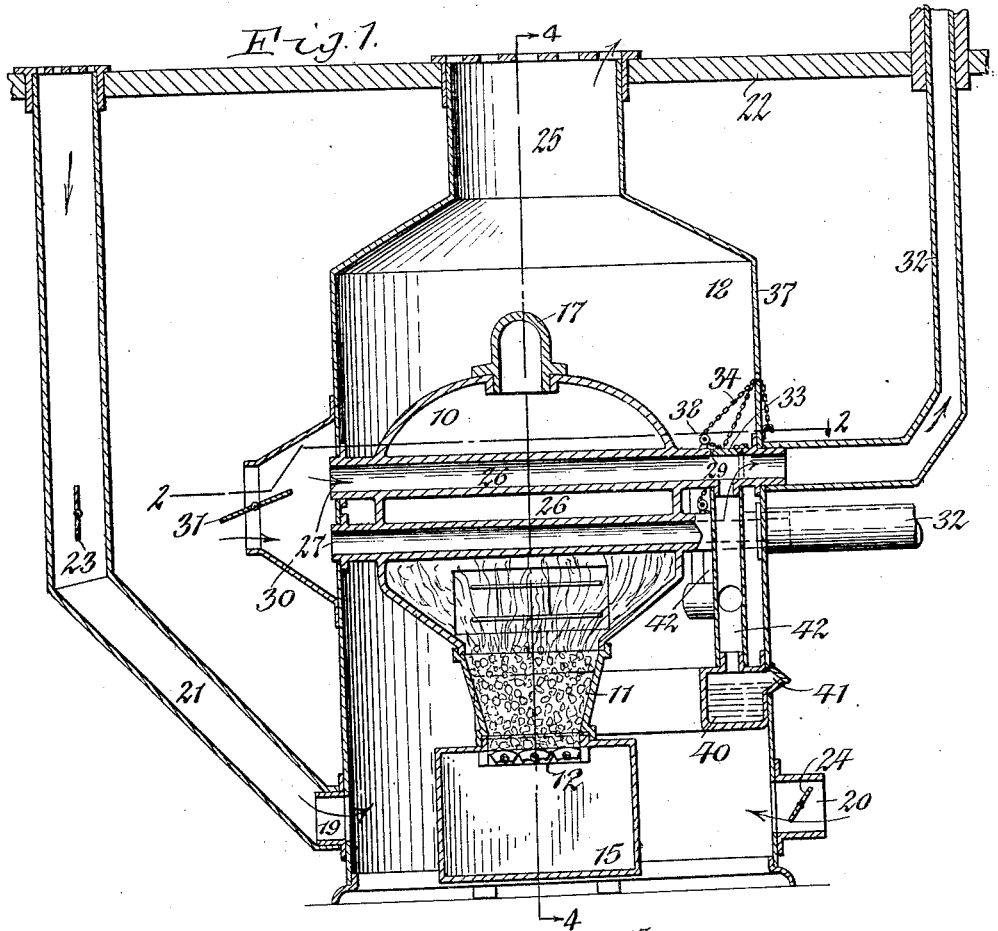
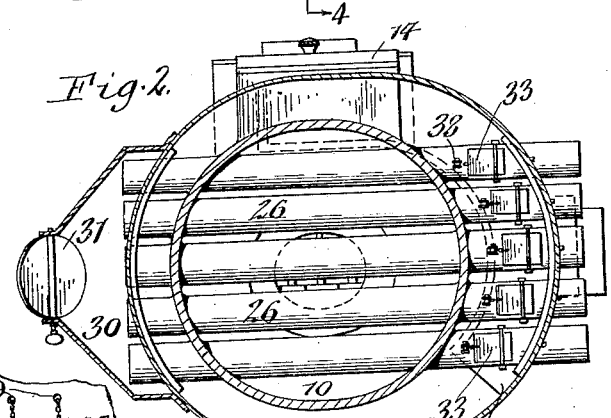
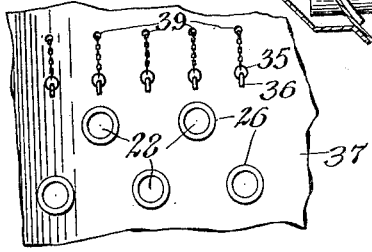
Inventor
Dewey A. Scott
by Geyer & Popp
Attorneys

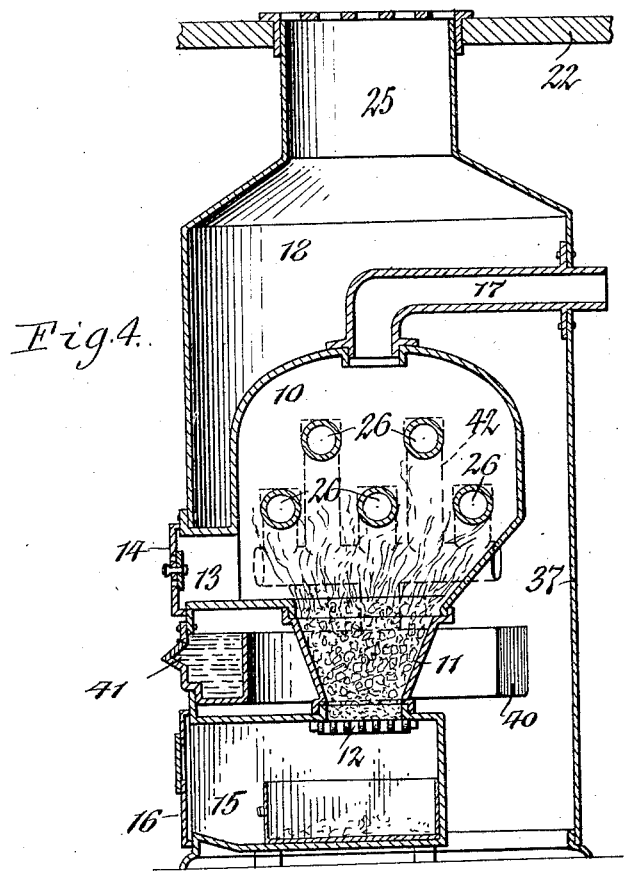
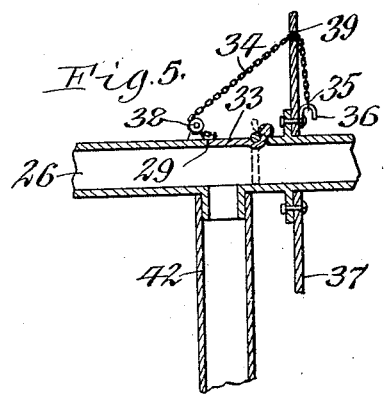

UNITED STATES PATENT OFFICE.

DEWEY A. SCOTT, OF BUFFALO, NEW YORK.

HOT-AIR FURNACE.

1,417,775.  Specification of Letters Patent.  Patented May 30, 1922.

Application filed December 4, 1920. Serial No. 428,188.

*To all whom it may concern:*

Be it known that I, DEWEY A. SCOTT, a citizen of the United States, residing in Buffalo, in the county of Erie and State of New York, have invented new and useful Improvements in Hot-Air Furnaces, of which the following is a specification.

This invention relates to a hot air furnace and has for its objects to simplify the construction, increase the heating efficiency, improve the capacity of distributing heat, and to provide reliable means for humidifying the heated air.

In the accompanying drawings: Figure 1 is a vertical section of a furnace embodying my improvements looking forwardly or toward the fuel inlet. Figure 2 is a horizontal section taken on line 2—2, Fig. 1. Figure 3 is a fragmentary side elevation of the furnace. Figure 4 is a vertical section taken on the correspondingly numbered line in Fig. 1. Figure 5 is a fragmentary vertical section, on an enlarged scale, of the means for directing the heated and humidified air in one of the supplemental air heating pipes either to the main outlet outside of the main air heating chamber or into the latter.

Similar characters of reference refer to like parts throughout the several views.

10 represents the combustion chamber or dome of a hot air furnace, 11 the fire pot arranged at the lower end of the combustion chamber and having a grate 12 in its bottom, 13 the fuel inlet of the fire pot having a door 14, 15 the ash pit arranged below the fire pot and having an ash outlet door 16, and 17 the smoke pipe leading from the top of the combustion chamber to the chimney.

18 represents the vertical main air heating chamber which surrounds the combustion chamber, fire pot and ash pit and which may be supplied with fresh air in any suitable manner, for instance by air inlets 19, 20 on opposite sides of its lower end, the inlet 19 in this instance being connected by a pipe 21 with an overhead room from the floor 22 from which the air is withdrawn while the other inlet 20 opens into the basement and draws air therefrom. The admission of air from these two sources may be regulated in any suitable manner, for instance by dampers or valves 23, 24 arranged in the pipe 21 and the inlet 20, respectively, as shown in Fig. 1. The heated air may be delivered from the main air heating chamber and in any suitable manner to the place where the same is required, this being done for example, as shown in Figs. 1 and 4, by an outlet pipe 25 leading from the top of the main air heating chamber through the floor 22 of the compartment overhead so as to heat the same directly.

Extending horizontally through the combustion chamber and the main air heating chamber are a plurality of supplemental air heating pipes or conduits 26 which are preferably arranged in two tiers or rows one above the other, and staggered relatively to each other, so that the heat rising from the burning fuel in the fire pot will strike these supplemental air pipes most effectively and heat the air passing through the same. This air is admitted to each of the supplemental air heating pipes through an inlet 27 at one end thereof and may be discharged either through a main air outlet 28 at its opposite end or this air may be discharged through an auxiliary air outlet 29. The inlets and main outlets of the several supplemental air heating pipes are arranged outside of the main air heating chamber, but the auxiliary air outlet of each supplemental pipe is arranged at the top thereof and is adapted to place this pipe in communication with the main air heating chamber. The inlets of the supplemental air heating pipes open into a manifold 30 and the admission of air from any suitable source may be regulated by a damper 31, as shown, or by equivalent means. The outlet of each supplemental heating pipe connects with a delivery pipe 32 leading to any desired compartment of the building in which the furnace is installed, for instance, as shown in Fig. 1, of the drawings, the same leads to an overhead room.

A valve device is provided for each supplemental air heating pipe whereby the air heated therein may be directed either to its main outlet or to its auxiliary outlet. In its preferred form this valve device comprises a vertically swinging gate valve 33 which is pivoted on the upper side of the respective supplemental air pipe adjacent to the outer edge of the auxiliary air outlet thereof. By this means the gate valve may be raised into a horizontal position, as shown in full lines in Figs. 1 and 5, whereby the auxiliary air outlet of the supplemental air pipe is closed and its main outlet is opened, while upon lowering this valve into a vertical position the main outlet of this pipe is closed and the auxiliary outlet thereof is opened. When the main outlet of a supplemental pipe is opened the heated air is carried therefrom indirectly by one of the delivery pipes to the respective compartment but when the auxiliary outlet thereof is opened the heated air therefrom is directed into the main air heating chamber and carried from the outlet of the latter to the compartment directly overhead.

Various means may be provided for operating each of the gate valves from the exterior of the furnace, the means shown being preferred and comprising a chain 34 connected with its inner end to the free edge of the valve gate and provided at its outer end with a ring 35 adapted to engage a hook 36 on the exterior of the wall 37 of the main air heating chamber the intermediate part of this chain passing around a guide pulley 38 on top of the supplemental air pipe adjacent to the inner edge of the auxiliary air outlet thereof and through an opening 39 in the wall 37. When the ring 35 engages the hook 36 the valve 33 is raised and when disengaged therefrom the valve drops by gravity into its other position, as shown by dotted lines in Figs. 1 and 5.

In order to humidify the heated air a water tank 40 is provided which is arranged within the lower part of the main air heating chamber adjacent to the fire pot so as to be heated thereby. The top of the tank opens into the main air heating chamber so that the vapors escape into the same and humidify the air therein preparatory to being delivered to the rooms of the building. Water is supplied to the tank when the same requires replenishing through one or more filling spouts 41 leading to the exterior of the wall 37. From the top of the water tank a plurality of vapor conduits or pipes 42 lead to the several supplemental air heating pipes, preferably to the underside of each of these pipes vertically in line with the auxiliary air outlet thereof, so that water vapors are supplied to the air therein in either position of the gate valve which controls the auxiliary air outlet of the same.

As a whole this hot air furnace is very simple in construction and presents a large heating surface which insures a large output of hot air and an economical use of fuel.

I claim as my invention:

1. A hot air furnace comprising a combustion chamber, an upright main air heating chamber enclosing said combustion chamber and having an air inlet and an air outlet, a supplemental air heating pipe extending horizontally through said combustion chamber, and having an air inlet and a main air outlet outside of said main air heating chamber and also having an auxiliary air outlet whereby said supplemental pipe may be placed in communication with said main air heating chamber, and a movable gate which in one position closes the main air outlet of said supplemental pipe and opens said auxiliary air outlet and in another position closes said auxiliary air outlet and opens said main outlet of the supplemental pipe.

2. A hot air furnace comprising a combustion chamber, an upright main air heating chamber enclosing said combustion chamber and having an air inlet and an air outlet, a supplemental air heating pipe extending horizontally through said combustion chamber and having an air inlet and a main air outlet at its opposite ends outside of said main air heating chamber and an auxiliary air outlet in its upper side between its ends which is adapted to place said supplemental air heating pipe in communication with said main air heating chamber, and a vertically swinging valve which in one position closes the main air outlet of said supplemental pipe and opens the auxiliary outlet thereof, and vice versa.

3. A hot air furnace comprising a combustion chamber, an upright main air heating chamber enclosing said combustion chamber and having an air inlet and an air outlet, a supplemental air heating pipe extending horizontally through said combustion chamber and having an air inlet and a main air outlet at its opposite ends outside of said main air heating chamber and an auxiliary air outlet in the upper side between its ends which is adapted to place said supplemental air heating pipe in communication with said main air heating chamber, a vertically swinging valve which in one position closes the main air outlet of said supplemental pipe and opens the auxiliary outlet thereof, and vice versa, and means for operating said valve from the exterior of the furnace.

4. A hot air furnace comprising a combustion chamber, an upright main air heating chamber enclosing said combustion chamber and having an air inlet and an air outlet, a supplemental air heating pipe extending horizontally through said combustion chamber and having an air inlet and a main air outlet at its opposite ends outside of said main air heating chamber and an auxiliary air outlet in its upper side between its ends which is adapted to place said supplemental air heating pipe in communication with said main air heating chamber, a vertically swinging valve which in one position closes the main air outlet of said supplemental pipe and opens the auxiliary outlet thereof, and vice versa, a water tank arranged in the lower part of said main air heating chamber and opening into the latter, and a pipe extending from the top of said water tank to the underside of said supplemental air heating pipe vertically in line with said auxiliary air outlet thereof.

DEWEY A. SCOTT.